(No Model.)
C. C. LEIWENICH.
WAGON AXLE.
No. 498,177. Patented May 23, 1893.
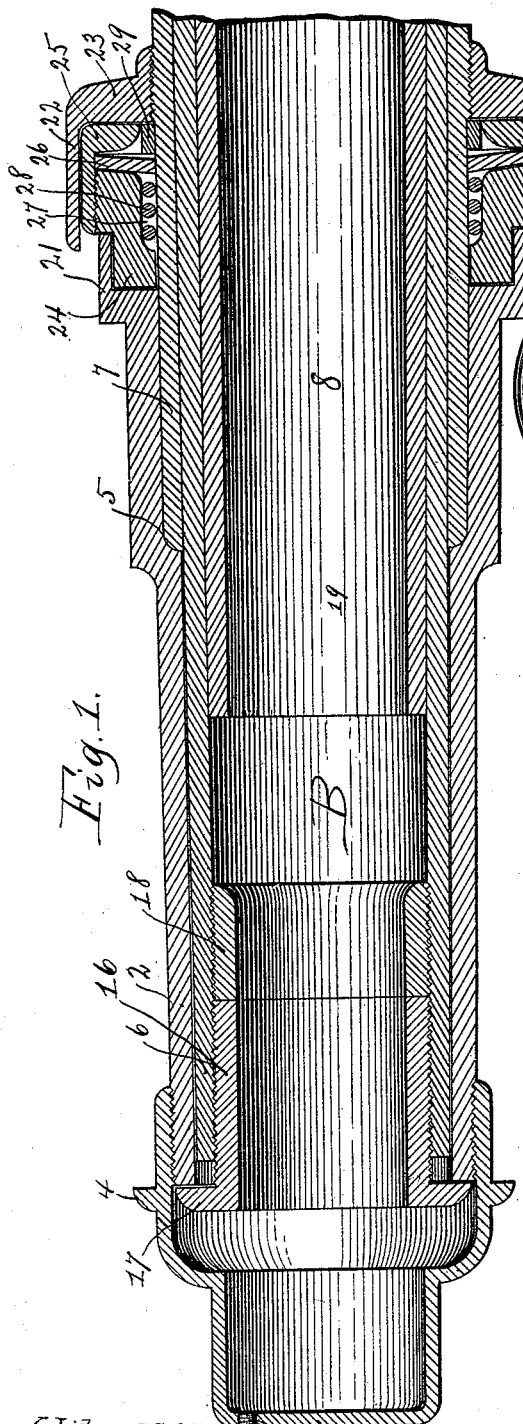
Witnesses:
Rudolph M. Lotz
James Meade
Inventor:
Charles C. Leiwenich
By Lotz Kennedy
Attorneys.

UNITED STATES PATENT OFFICE.

CHARLES C. LEIWENICH, OF CHICAGO, ILLINOIS.

WAGON-AXLE.

SPECIFICATION forming part of Letters Patent No. 498,177, dated May 23, 1893.

Application filed December 20, 1892. Serial No. 455,843. (No model.)

*To all whom it may concern:*

Be it known that I, CHARLES C. LEIWENICH, a citizen of the United States, residing at Chicago, in the county of Cook and State of Illinois, have invented certain new and useful Improvements in Wagon - Axles and Oil-Guards; and I do hereby declare the following to be a full, clear, and exact description of the invention, such as will enable others skilled in the art to which it appertains to make and use the same.

This invention relates to a novel construction in axles, and more particularly to a hollow or tubular axle for wagons and devices for lubricating the same, and also in the novel construction of an oil and dust guard for a device of this description.

The object of my invention is to provide an axle of this description of simple, durable and efficient construction, and it consists in the features of construction and combinations of parts hereinafter fully described and specifically claimed.

In the accompanying drawings illustrating my invention,—Figure 1 is a vertical longitudinal sectional view of the end portion of an axle and a fragment of the wheel hub, constructed in accordance with my invention. Fig. 2 is a view of a greater portion of the axle and the wheel partly in section and in side elevation. Fig. 3 is a sectional view on another scale taken on the line 3—3 of Fig. 2.

Referring now to said drawings, A indicates a wheel and B the axle as a whole. The said axle B is hollow and consists of several tubular sections put together as hereinafter described. The wheel A has a hub 1 and the box 2 secured therein in a familiar manner. Around the end of the hub and adjacent the outer end thereof is made an annular recess that is located between the hub and the end of the box 2 to receive the inner end of the lubricator cup 3 that is interiorly screw-threaded at its inner end to engage the exteriorly screw-threaded portion of the box 2, as clearly shown in said Fig. 1. The said cup 3 is provided with an exterior annular rib or shoulder 4 that is adapted to encounter the end of the hub and to form a stop in an obvious manner, as well as an ornamental projection. The said box 2 is enlarged interiorly near its rear end, as shown at 5, for the purpose hereinafter described.

The portion of the axle B that is located within the hub is composed of three sections 6, 7 and 8, each of which is a tubular or hollow piece. The said section 6 forms the end of the axle and fits within the main portion of the box 2, while the section 7 is located around the said section 6 and is rigidly secured thereto, conveniently by welding, and fits within the enlarged portion 5 of said box 2, so that when the hub is placed upon the axle it will fit snugly upon the sections 6 and 7 thereof with the shoulder formed between the large and small portions of the box encountering the shoulder formed between the said sections 6 and 7.

The length of the box 2 from the enlarged portion 5 to the outer end thereof is somewhat longer than the section 6 from the end of the section 7, as clearly shown, so that when the hub is in place the end of the box projects beyond the end of the axle. The section 8 of the axle is located within the section 6 and at the joint or overlapping portions of said sections 6 and 7 and serves to strengthen said part, for it will be noted that the said sections 6 and 7 of the axle will be subjected to considerable strain at this point.

In constructing the axle the sections 6 and 7 are placed together and the section 8 is then placed within the section 6, and the three sections are then welded together to provide a rigid and strong joint. As both ends of the axle are similar in construction I have illustrated only one end portion thereof and a detailed description of one will suffice. The connection between the end portions of the axle consists of a hollow axle portion 9 and the wooden axle 10. The hollow metallic axle portion 9 fits within the axle section 7, while the wooden axle 10 rests upon the top of said section 7 and is held in place thereon by a bail 11 passing over the top thereof and secured at its lower end to eyes 12 upon a collar 13 having a screw-threaded or other suitable connection with the end of the axle section 7. To provide a rigid and strong connection between these parts and to hold the end sections of the axle rigid against the strains to which they may be subjected, I provide a tie-rod 14 that is connected at its opposite ends with eye-lugs 15, projecting downwardly from the collar 13, the connection between the said tie-rods and the eye-lugs being adjustable so that it can be tightened up to hold the parts always rigidly together and to compensate for wear. The said hub is held upon the axle by means of a hollow nut 16 that is exteriorly screw-threaded to engage the interior screw-thread in the end of the section 6 of the axle, said nut 16 being provided at its outer end with an annular flange 17 located to encounter the end of the box 2 of the axle, so that when said nut is screwed into place the said flange 17 will engage the end of the box and thus serve to hold it in place upon the axle.

As before described the end of the box projects beyond the end of the axle, so that by screwing the nut 16 farther in the box will be forced back upon the axle to compensate for any wear between the parts, and to limit the inward movement of the nut 16 I provide a regulating nut 18 that screws into the section 6 of the axle in advance of the said nut 16, so that the extent to which said nut 16 can be moved inwardly is regulated by the nut 18 in an obvious manner. Both of said nuts 16 and 18 are hollow and are squared or given some other shape so that they can be engaged and turned by any suitable tool.

The devices for lubricating the axle are constructed as follows: It will be noted that the entire axle is hollow, so that a considerable supply of oil can be contained therein, and in the end of the hollow axle 9 I place a plug 19 to prevent the oil from passing inwardly beyond this point. In the lubricator cup 3 a hole or opening 20 is made that is closed by a screw plug, and through this opening 20 the lubricant can be introduced into the interior of the axle. The cup 3 on the end of the box 2 will prevent the escape of oil at this end of the axle, and the oil will find its way around the flange 17 of the nut and into the space between the axle and box 2 to lubricate the same. The guard for preventing the escape of oil at the rear end of the hub and for preventing the entrance of dust or dirt at this point is located between an overhanging flange 21 at the rear end of the box, and a sleeve 22 upon the axle in the rear of said flange. The said sleeve 22 stands out beyond the flange 21 and overlaps the same, and is secured to the axle by a hub 23 conveniently by a screw-threaded connection. A metallic washer 24 fits around the axle and beneath the flange 21 and has its outer face about even with the outer face of the flange 21. The outer face of the said washer 24 is screw-threaded to engage the screw-thread upon another metallic washer 25, which is angular in cross section and forms a close joint with the interior faces with the sleeve 22 and hub 23. A space is left between the end of washer 24 and the vertical portion of washer 25 in which is located a flexible washer 26 preferably of leather, and said washers 24 and 25 are screwed together to hold the outer edge of said leather washer tightly between the same to form an oil-tight joint. The said metallic washer 24 is provided interiorly at its end adjacent to the leather washer 26 with an annular recess 27 in which is located a spring 28 that bears at its opposite ends against the rear wall of said recess 27 and the inner portion of the leather washer 26. Located between the said leather washer 26 and the inner face of the hub 23 is a rubber ring 29 that serves to hold the inner portion of the leather washer 26 against the action of the spring so that said spring will serve to hold the metallic washer 24 close against the flange 21 to form a close joint between these parts to prevent the escape of oil, while the leather washer will be pressed against the rubber ring 29 to prevent the entrance of oil between these parts, and will thereby press the rubber ring 29 against the hub 23 which will prevent the escape of oil between these two parts, so that it will be seen that the said guard will effectually retain the oil at the rear end of the hub and also prevent the entrance of dust at this point.

I claim as my invention—

1. An axle having its end portions consisting of two hollow sections 7 and 8, said section 7 receiving the end of said axle at one end, and at its other end receiving the end of said other hollow section 6, said hollow section 6 being smaller than said section 7 to provide a forwardly facing shoulder to encounter an inwardly facing shoulder on a hub box, substantially as described.

2. An axle having its end portions consisting of three hollow sections 6, 7 and 8, said section 7 receiving at one end the end of the axle and at its other end the end of section 6, and said section 8 being located within said section 6 opposite its joint with the said section 7, substantially as described.

3. A wagon axle consisting of a main section 9 and hollow axle sections on each end of said main section, a collar on said hollow axle sections, a tie rod connecting said collars, substantially as described.

4. The combination with an axle having a hollow end portion interiorly screw threaded, a hollow nut 16 engaging said screw threaded portion and having an outwardly extending flange at its outer end, of a hub mounted upon said axle and retained by said nut 16, and a lubricator cup 3 secured to and closing the end of said hub, substantially as described.

5. The combination with an axle having a hollow end portion interiorly screw threaded, of a regulating nut 18 located therein and movable back and forth, and a nut 16 also located therein and adapted to encounter the end of the regulating nut 18, and having an outwardly extending flange 17 at its outer end, substantially as described.

6. The combination with a hollow axle and a hub located thereon, and retained by a hollow nut secured to the end of said axle, of an oil cup secured to the end of said hub over the end of the axle, substantially as described.

7. The combination with a sleeve 22 upon an axle, of a hub box having an overhanging flange 21 located adjacent to said sleeve, washers 24 and 25 connected together and encountering said flange and sleeve, a flexible washer 26 held between said washers 24 and 25, a spring located within a recess in said washer 24 and bearing against said flexible washer 26, and a flexible ring upon the axle between said washer 26 and the hub of said sleeve 22, substantially as described.

8. The combination with the axle having a sleeve 22, of a hub mounted upon the axle, washers 24 and 25 connected together and located between said sleeve 22 and the end of the hub, a flexible washer 26 carried by said washers 24 and 25, a flexible bearing ring 29 located on one side of said flexible washer 26, and a spring 28 located on the other side of said flexible washer and bearing at its opposite ends against said flexible washer and against one of said other washers, substantially as described.

In testimony whereof I affix my signature in presence of two witnesses.

CHARLES C. LEIWENICH.

Witnesses:
HARRY COBB KENNEDY,
RUDOLPH W. LOTZ.